United States Patent [19]

Björhaag et al.

[11] Patent Number: 4,902,445

[45] Date of Patent: Feb. 20, 1990

[54] FIBER BOARD, A METHOD FOR MAKING IT, AND A BINDER COMPOSITION

[75] Inventors: Georg Björhaag, Åmål; Göran Embring, Väröbacka; Karl-Gunnar Stähl, Karlstad, all of Sweden

[73] Assignee: Nova Scand Utveckling AB, Sweden

[21] Appl. No.: 185,468

[22] Filed: Apr. 25, 1988

Related U.S. Application Data

[62] Division of Ser. No. 804,645, Jan. 21, 1986, Pat. No. 4,761,342.

[30] Foreign Application Priority Data

Mar. 16, 1984 [SE] Sweden ................... 8401467

[51] Int. Cl.$^4$ .............. C09K 21/00; B32B 21/04; B32B 21/06
[52] U.S. Cl. .................... 252/607; 106/18.12; 106/18.23; 106/18.34; 428/15; 428/106; 428/113; 428/325; 428/452; 428/453; 428/537.1; 428/921; 252/601; 252/602
[58] Field of Search ............ 252/607, 601, 602; 106/18.12, 18.23, 18.34; 428/921

[56] References Cited

U.S. PATENT DOCUMENTS

| | | | |
|---|---|---|---|
| 2,223,240 | 11/1940 | Hughes | 138/137 |
| 2,552,597 | 5/1951 | Smith | 106/163 |
| 2,864,715 | 12/1958 | Glab | 106/163 |
| 3,377,229 | 4/1968 | Bryan | 161/22 |
| 3,811,992 | 5/1974 | Handa et al. | 252/607 |
| 4,182,681 | 1/1980 | Gumbert | 106/18.13 |
| 4,224,169 | 9/1980 | Retana | 252/8.05 |
| 4,263,048 | 4/1981 | Hacker | 106/84 |
| 4,323,494 | 4/1982 | Blount | 524/588 |
| 4,332,712 | 6/1982 | Blount | 524/650 |
| 4,332,926 | 6/1982 | Blount | 524/650 |
| 4,350,775 | 9/1982 | Blount | 521/100 |
| 4,357,429 | 11/1982 | Blount | 524/650 |
| 4,582,755 | 4/1986 | Detrick | 428/324 |

FOREIGN PATENT DOCUMENTS

068856 5/1983 European Pat. Off. .
557371 11/1943 United Kingdom .

*Primary Examiner*—Howard J. Locker
*Attorney, Agent, or Firm*—Merchant, Gould, Smith, Edell, Welter & Schmidt

[57] ABSTRACT

Fiber boards of high strength which are highly water- and flame-resistant are disclosed, as well as a method for making such boards and an inorganic binder composition for bonding wood fibers. The boards comprise a lignin-containing fiber material, a binder derived from a binder composition comprising an alkali silicate solution, sulphur and/or an inorganic sulphur compound, and a calcium and/or magnesium compound and, optionally, fillers and/or hydrophobing agents.

The fiber boards are manufactured by mixing the lignin-containing fiber material with the binder composition and optional further additives, whereupon the mix is compressed at a high pressure and at a temperature of 130°–230° C.

12 Claims, 1 Drawing Sheet

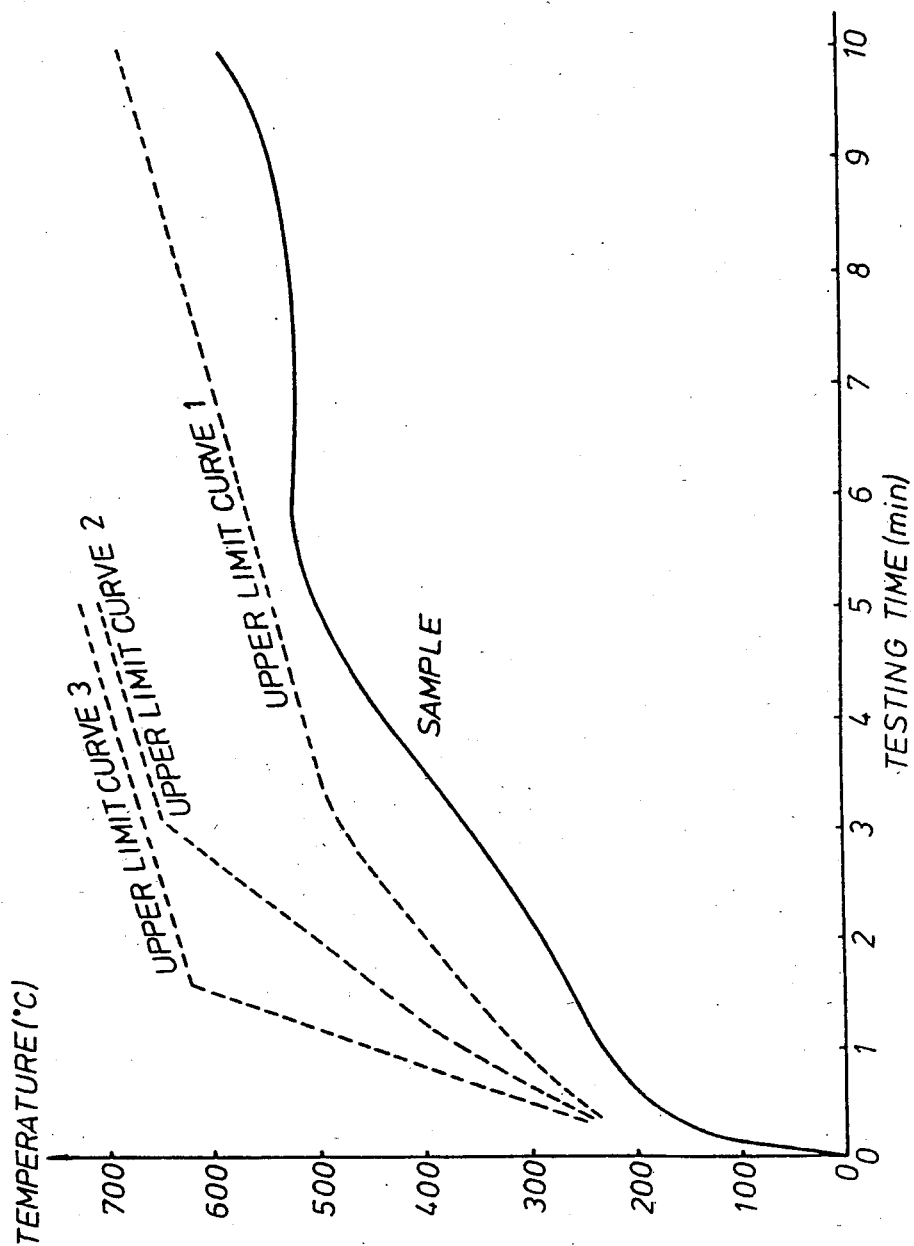

FIBER BOARD, A METHOD FOR MAKING IT, AND A BINDER COMPOSITION

This is a division of application Ser. No. 804,645, filed Jan. 21, 1986, now U.S. Pat. No. 4,761,342.

The present invention relates to a fiber board having high strength as well as high water and flame resistance, a method for making said board, and a new type of an inorganic binder for bonding wood fibers.

In the manufacture of fiber boards, e.g. particle boards, certain demands are placed on the binder used. Except that it should yield a board of high strength and water resistance, it should be inexpensive and non-toxic. If the binder also contributes to making the board more flame-resistant, this is of course a substantial advantage.

As binders for fiber boards, use has hitherto been made primarily of organic resins, especially urea-formaldehyde resins, which are advantageous in many respects, for instance by having high reactivity, by being inexpensive and yielding boards of high strength and acceptable water resistance. However, they suffer from a considerable drawback because, even after setting, they emit formaldehyde, which is regarded as a relatively toxic substance, for a long period of time. Different methods are used for reducing the emission of formaldehyde, but this problem has not yet been solved. Therefore, the usefulness of formaldehyde-bonded particle boards e.g. for internal walls in houses, is being increasingly questioned.

Further, the organic binders yield boards with relatively poor flame resistance. In order primarily to improve the flame resistance, different inorganic binders have been tried in the manufacture of fiber boards.

In most cases, the inorganic binders have been based on water glass, i.e. a solution of alkali silicate in water. Water glass has in itself too low a dry content and too low a reactivity to be suitable in this connection. By adding inorganic fillers and setting agents of different kinds, it is possible to solve these problems to a certain extent. By using suitable combinations of water glass-setting agent-filler, boards with relatively good mechanical properties have been obtained (see e.g. GB patent specification 557,371 and EP patent specification 68,856).

The use of a water glass binder in fiber boards generally results in a considerable improvement of the flame resistance as compared with conventional resin-bonded boards. However, the major problem in water glass-bonded boards is the resistance to water. Water glass glue when set has the very poor water resistance, and despite substantial efforts to find hydrophobing agents for the systems, this problem has not yet been solved. For this reason, water glass-bonded boards have not yet become useful in actual practice.

The present invention comprises a fiber board manufactured with a new type of binder composition. The use of the new binder, which is of an inorganic nature, in the manufacture of a fiber board yields a board combining high strength and acceptable water resistance with high flame resistance. Since the binder does not contain any organic resins of any type, the problems related to the emission of formaldehyde and other organic setting products will also be overcome.

The fiber board according to the present invention consists of a lignin-containing fiber material, a binder derived from a binder composition and, optionally, further components, such as fillers and hydrophobing agents.

The lignin-containing fiber material may consist e.g. of wood fibers in general, wood chips and so-called wafers. Other less common waste products, such as rice hulls and straw, can also be used.

The binder composition used for manufacturing the fiber board consists of a mixture of the following components:
(a) an alkali silicate solution
(b) sulphur and/or an inorganic sulphur compound
(c) a calcium and/or magnesium compound.

Preferably, the alkali silicate solution is a solution of sodium silicate (Na-water glass) or potassium silicate (K-water glass) in water. The preferred dry content range is 40–60% and the most preferred silicate is Na-water glass in which the ratio of $SiO_2$ to $Na_2O$ is in the range of 3.5–1.4.

The sulphur component preferably is elementary sulphur, sodium sulphide or sodium sulphite. It is also possible to use other inorganic sulphur compounds, such as calcium sulphide, calcium sulphite and ferrous sulphide. In some cases, mixtures of different sulphur components may be preferred. A specially preferred sulphur component is elementary sulphur.

The calcium and/or magnesium compound preferably is a calcium compound, such as calcium hydroxide, calcium oxide and calcium chloride, of which calcium hydroxide is particularly preferred.

As mentioned above, the use of other additives in the fiber boards, such as fillers and/or hydrophobing agents, may be desirable in some cases. The filler may for instance be a common mineral, such as clay, chalk, talc or wollastonite, which primarily serves to increase the dry content of the binder solution. These minerals which are normally regarded as inert (e.g. in coating slips for paper) will take part to some extent in the setting process by reacting with the alkali silicate component. The filler may also be a wear-resistant material, a so-called wear mineral, for instance finely ground iron ore (dressed ore), whereby fiber boards of high wear resistance are obtained.

A large number of different substances may be used as hydrophobing agents. In the manufacture of boards or slabs, traditional hydrophobing agents, such as oils, fatty acids and synthetic or natural waxes, can be used.

Certain boron compounds, such as boric acid and borax, have been found to produce a certain hydrophobing effect, probably as a result of a reaction with silicate components. The same applies to certain aluminium compounds, such as alum. Further, delignifying agents known from the manufacture of papermaking pulp, such as anthraquinone and dihydroanthraquinone, have been found in certain cases to favourably affect the water resistance of the boards.

The proportions of the components included in the fiber board may vary within wide ranges. A suitable weight ratio however is 30–70 parts of lignin-containing fiber material, 20–60 parts of binder composition, and a total of 0–50 parts of the other components, such as filler and hydrophobing agent.

The components of the binder composition are suitably present in a weight ratio of 50–90 parts of alkali silicate solution, 0.5–10 parts of sulphur or sulphur compound, and 10–40 parts of calcium or magnesium compound. If so desired, and depending upon the dry content of the water glass, water may be added to the binder composition. In such a case, the amount of water must be calculated on the basis of the dry content of the silicate solution, i.e. the higher the dry content is, the larger amount of water must be added to obtain the same total dry content in the composition.

Since the alkalinity of the silicate solution can be varied, as mentioned above, by varying the ratio of $SiO_2$ to $Na_2O$, it is obvious that alkali in the form of sodium or potassium hydroxide can be added to the composition if a less alkaline water glass is used. However, this should not be regarded as a further addition, but merely as another way of introducing alkali ions and hydroxide ions.

The present invention further relates to a method of making a fiber board bonded with the new inorganic binder composition, which method is characterized in that a lignin-containing fiber material is mixed with an alkali silicate solution, sulphur and/or an inorganic sulphur compound, a calcium and/or magnesium compound and, optionally, further additives, such as fillers and/or hydrophobing agents, and is compressed under pressure at 130°-230° C.

The different components of the board can be mixed in any suitable order. A presently preferred method comprises the following steps:

(a) the lignin-containing fiber and, optionally, filler are mixed with the sulphur component and at least part of the calcium and/or magnesium compound, (b) the alkali silicate solution and any remaining calcium and/or magnesium compound are added, whereupon the batch is thoroughly mixed, and finally (c) the mix is compressed under pressure at a temperature of 130°-230° C.

Any further optional components, such as hydrophobing agent, may be added either in step (a) or (b) above, but may also be applied to the finished board in a subsequent treatment step.

Many different types of fiber boards can be manufactured with the binder composition according to the present invention.

As compared with conventional fiber boards, the fiber boards of the present invention are superior primarily by having a very high flame resistance and by not emitting formaldehyde or any other organic setting products. Thus, the fiber boards of the invention are well suited for use as structural material. One example of such a structural material is a multi-layer particle board.

The reaction steps of the setting process in the manufacture of the fiber boards according to the invention are not known. One theory is that the polymeric silicate ions act as the principal binder by bonding to the fibers, primarily by physical forces, so as to link the fibers together. At the same time, the calcium and/or magnesium ions will react with the silicate and form a relatively water-immiscible product. Concurrently, the strongly alkaline silicate solution probably releases from the fibers a certain amount of lignin which is then probably contributory to the binder effect. The presence of the sulphur component entails an increase in the rate of delignification.

All three binder components, i.e. alkali silicate solution, sulphur and/or an inorganic sulphur compound as well as a calcium and/or magnesium compound, are necessary for the invention.

As will appear from Example 1 below, considerably poorer characteristics of the fiber board are obtained if any of the components, no matter which, is omitted.

A binder system composed of the above-mentioned three components is not previously known for use in the manufacture of boards or slabs of lignin-containing fiber material. However, each one of the components is known per se and has been tested, e.g. in the manufacture of particle boards (see e.g. U.S. patent specification 2,552,597 and the above-mentioned two patent specifications). Further, combinations of water glass and modified lignin have previously been tested (see DE 3,241,495).

The highly positive effect which is produced when the three binder components are mixed and combined with a lignin-containing fiber material thus is completely unexpected.

The Examples given below are merely intended to illustrate the invention without restricting it in any way.

EXAMPLE 1

Particle boards of an area of 277×162 mm and a thickness of 11.7-12.0 mm were manufactured with different binder compositions, both in accordance with the invention (tests 1-4 and 8), and with the exclusion of one of the components of the composition according to the invention (tests 5-7).

The boards were manufactured in the following way. The components were added by first mixing ⅔ of the calcium hydroxide and the entire sulphur component in water and thereafter adding the chips, whereupon the mix was agitated. Na-water glass and the remaining calcium hydroxide were then added, and the vigorous agitation was continued for about 3 min. The material was thereafter spread on a plate and compressed at 155° C. for 4 min, at full pressure (35 kg/m²) for 2 min and at a decreasing pressure for 2 min. The finished particle boards had a density of about 880 kg/m³.

The table below shows the result of the tests, swelling after 2 hours in water at 20° C. and the Z-strength being indicated as examples of two important properties of the products.

TABLE

| | COMPONENTS (parts by weight) | | | | | | PROPERTIES | |
|---|---|---|---|---|---|---|---|---|
| Test | Chips | Ca(OH)$_2$ | S | Na$_2$SO$_3$ | Na$_2$S | Water glass* | Water | Z-strength (N/mm$^2$) | Swelling (%) |
| 1. | 400 | 150 | 9 | — | — | 340 | 85 | 0.62 | 8 |
| 2. | 400 | 75 | 9 | — | — | 170 | 60 | 0.42 | 12 |
| 3. | 400 | 150 | — | 36 | — | 340 | 85 | 0.64 | 10 |
| 4. | 400 | 150 | — | — | 47 | 340 | 85 | 0.57 | 10 |
| 5. | 400 | — | 9 | — | — | 340 | 85 | board delaminated | |
| 6. | 400 | 150 | 9 | — | — | — | 100 + A** | board delaminated | |
| 7. | 400 | 150 | — | — | — | 340 | 85 | 0.53 | 21 |
| 8. | 400 | 150 | 45 | — | — | 340 | 85 | 0.49 | 7 |

*ratio of SiO$_2$ to Na$_2$O 1.8; dry content 55%
**A = a solution of 20 g NaOH in 85 ml water

EXAMPLE 2

The particle board manufactured in accordance with test 1 in Example 1 was tested with respect to flame resistance. The testing method used was SIS 024823 which relates to determination of the tendency of surface layers to ignite and emit smoke. The result appears from the accompanying graph (the FIGURE). As appears, the board is below the upper limit curve 1, which is remarkable for a particle board. Further, the smoke emission during the test was less than two scale units, which is a very low value.

We claim:

1. A binder composition for use in bonding wood fibers, said composition consisting essentially of:
   (a) 50-90 parts by weight of an alkali silicate solution;
   (b) 0.5-10 parts by weight of a sulphur component; and
   (c) 10-40 parts by weight of a metal component selected from the group consisting of calcium compounds, magnesium compounds and mixtures thereof.

2. The binder composition of claim 1 wherein said sulphur component is selected from the group consisting of sulphur, inorganic sulphur compounds and mixtures thereof.

3. The binder composition of claim 2 wherein said sulphur component is sulphur, sodium sulphide or sodium sulphite.

4. The binder composition of claim 2 wherein said inorganic sulphur compound is selected from the group consisting of sodium sulphide, sodium sulphite, calcium sulphide, calcium sulphite, ferrous sulphide and mixtures thereof.

5. The binder composition of claim 1 wherein said alkali silicate solution is an aqueous alkali silicate solution.

6. The binder composition of claim 5 wherein said aqueous alkali silicate solution includes about 40-60% by weight of said alkali silicate.

7. The binder composition of claim 5 wherein said alkali silicate includes a silicate selected from the group consisting of sodium silicate and potassium silicate.

8. The binder composition of claim 7 wherein said alkali silicate comprises sodium silicate.

9. The binder composition of claim 1 wherein said alkali silicate solution comprises $SiO_2$ and $Na_2O$ in a ratio of 3.5:1-1.4:1.

10. The binder composition of claim 1 wherein said metal component is a calcium compound.

11. The binder composition of claim 10 wherein said calcium compound is selected from the group consisting of calcium hydroxide, calcium oxide, and calcium chloride.

12. The binder composition of claim 11 wherein said calcium compound is calcium hydroxide.

* * * * *